United States Patent [19]

Sugino

[11] Patent Number: 4,897,736
[45] Date of Patent: Jan. 30, 1990

[54] COLOR IMAGE PROCESSING APPARATUS USING A DEFORMED DOT MATRIX

[75] Inventor: Takashi Sugino, Kawasaki, Japan

[73] Assignee: Canon Kabushiki Kaisha, Tokyo, Japan

[21] Appl. No.: 355,836

[22] Filed: May 22, 1989

Related U.S. Application Data

[63] Continuation of Ser. No. 168,601, Mar. 4, 1988, abandoned, which is a continuation of Ser. No. 876,669, Jun. 20, 1986, abandoned, which is a continuation of Ser. No. 500,348, Jun. 2, 1983, abandoned.

[30] Foreign Application Priority Data

Jun. 9, 1982 [JP] Japan .................. 57-97573

[51] Int. Cl.$^4$ .................. H04N 1/40; H04N 1/46
[52] U.S. Cl. .................. 358/457; 358/75; 358/298; 358/459
[58] Field of Search .................. 358/75, 77, 78, 79, 358/80, 283, 298, 75 IJ, 456, 457, 459, 460

[56] References Cited

U.S. PATENT DOCUMENTS

| | | | |
|---|---|---|---|
| 3,742,129 | 6/1973 | Roberts et al. | 358/78 |
| 3,922,484 | 11/1975 | Keller | 358/75 |
| 4,052,715 | 10/1977 | Streifer | 358/298 |
| 4,149,194 | 4/1979 | Holladay | 358/283 |
| 4,185,304 | 1/1980 | Holladay | 358/283 |
| 4,412,225 | 10/1983 | Yoshida et al. | 358/75 IJ |
| 4,486,788 | 12/1984 | Yamada | 358/283 |
| 4,752,822 | 6/1988 | Kawamura | 358/75 |
| 4,783,837 | 11/1988 | Kawamura et al. | 358/457 |

FOREIGN PATENT DOCUMENTS 2262824 11/1974 Fed. Rep. of Germany .

OTHER PUBLICATIONS

P. Stucki, "Electronic Halftoning for Color Reproduction", *IBM Technical Disclosure Bulletin*, vol. 20, No. 6, Nov. 1977, pp. 2423–2425.

Primary Examiner—James J. Groody
Assistant Examiner—Randall S. Svihla
Attorney, Agent, or Firm—Fitzpatrick, Cella, Harper & Scinto

[57] ABSTRACT

A color image processing apparatus avoids uneven recording of date used to form the reproduced color image, which using a reduced memory capacity, by suitable deformation of square dot submatrices within a square dot matrix used in halftone dot reproduction, to provide desired screen angles, and by reproducing different density levels with different arrangements of dots within the same dot pattern.

7 Claims, 6 Drawing Sheets

COLOR IMAGE PROCESSING APPARATUS USING A DEFORMED DOT MATRIX

This application is a continuation of application Ser. No. 07/168,601 filed on Mar. 4, 1988 which is a continuation of application Ser. No. 06/876,669 filed Jun. 20, 1986 which is a continuation of Ser. No. 06/500,348 filed on Jun. 2, 1983, all now abandoned.

BACKGROUND OF THE INVENTION

1. Field of the Invention

The present invention relates to an image processing method and an apparatus therefor for recording a color image with dots of different colors.

2. Description of the Prior Art

In case of recording a color image with dots of different colors, for example ink dots of cyan, magenta, yellow and black colors, it is necessary to record intermediate gradations in each color.

For the purpose of recording intermediate gradations in color image recording with color dots, there is already known a method of constituting each pixel with a screen dot pattern composed of a matrix of small dots, and representing the gradation of said pixel by the area and arrangement of high-density small dots in said matrix.

Also in order to represent arbitrary colors with dots of limited colors for example in a color ink jet printer, there is employed a method of recording such dots in overlapping manner to achieve subtractive color mixing. However, in the case of representing intermediate colors by superposing screen dots of different colors for each pixel, unevenness in the recorded color may result if the extent of overlapping of different color dots varies, because the state of subtractive color mixing also varies, for example, due to a change in the internal reflection in each ink dot, thus giving rise to variation in the resulting color. If the same arrangement of screen dots is employed for all colors, the above-mentioned unevenness in color is difficult to avoid since it is extremely difficult to record such screen dots without variation in the extent of overlapping of said dots. Therefore, in order to avoid such difficulty of color unevenness, there is employed a method of arranging the screen dots of different colors respectively in different so-called screen angles, so that exact overlapping of different color dots need not be controlled even when the same dot arrangement is employed for different colors. The use of such screen angles limits such color unevenness, if any, within a small area, thereby rendering such color unevenness inconspicuous.

However, in the conventional method, such a screen angle is obtained by merely inclining the screen dot pattern composed of a square dot matrix. It has therefore been necessary, for recording a color image with screen dots of desired screen angles, to store the binary data for each dot matrix in the screen patterns for different colors with different screen angles in a memory device, for example, a read-only memory, and to read such stored data in response to the gradation signal of each pixel of the color image to be recorded. Therefore such conventional color image processing method has been associated with the serious drawback of requiring an enormous memory capacity.

Figure 5A:
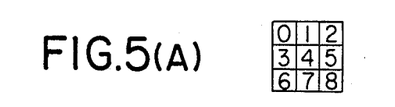
FIGS. 5A to 5H are views showing the relationship between the forms of screen dot patterns and the screen angles.
Figure 5B:
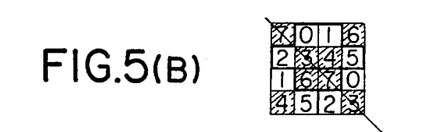
Figure 5C:
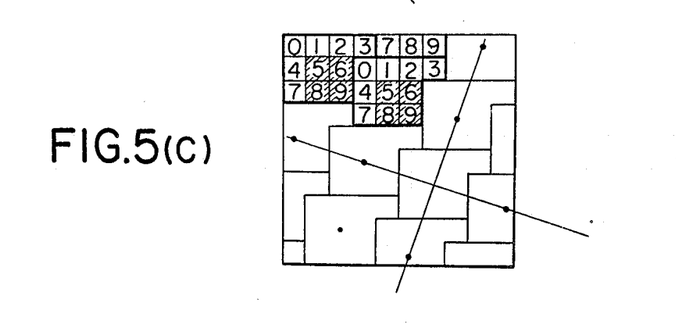
Figure 5D:
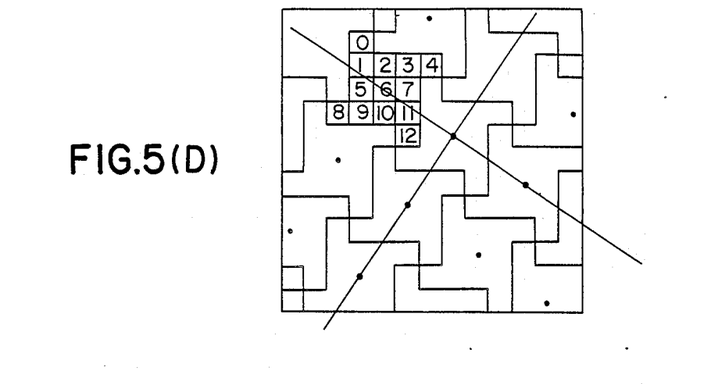
Figure 5E:
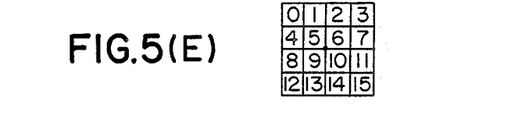
Figure 5F:
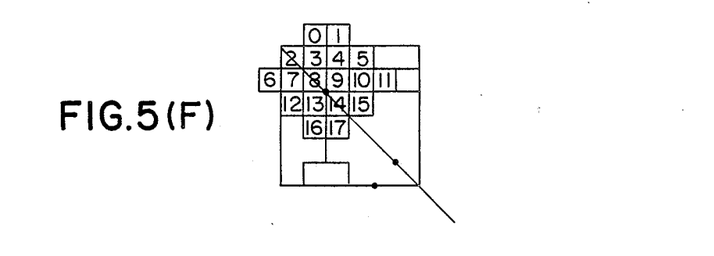
Figure 5G:
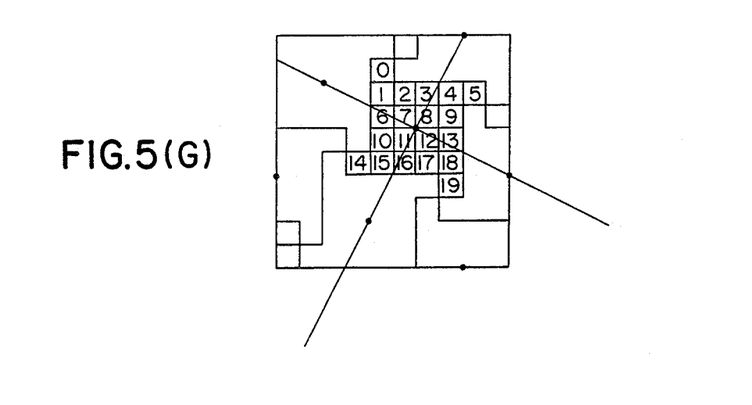
Figure 5H:
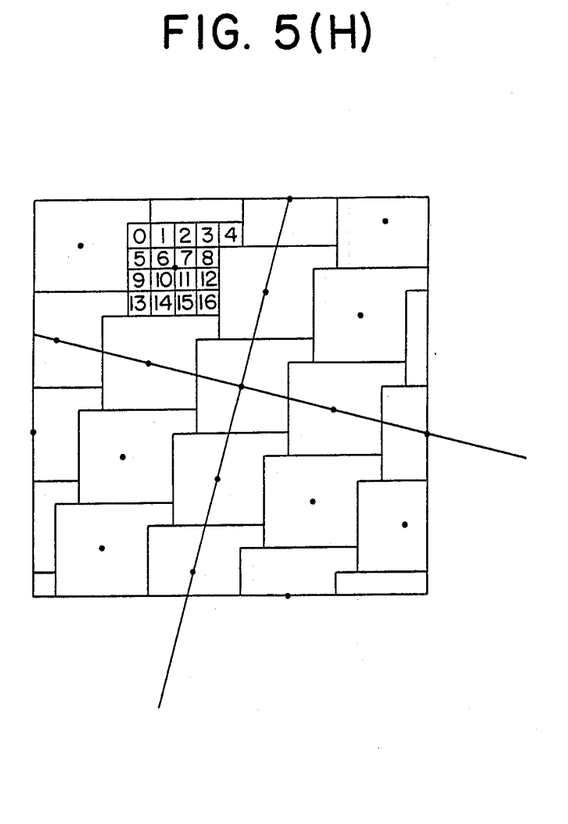

More specifically, for example, color image recording with screen dots having different screen angles respectively for different colors and each composed of a 4×4 square dot matrix as shown in FIG. 5E for representing 16 density levels, there will be required a memory capacity of 4×4×16=256 bits for each color. Also in the use of a screen dot composed of a 17×17 dot matrix as shown in FIG. 5H for recording a color image of a relatively high quality there will be required a memory capacity of 17×17×16=4,624 bits for each color, and a screen dot composed of a 32×32 dot matrix for a still finer image quality requires a memory capacity of 32×32×16=16,384 bits for each color.

SUMMARY OF THE INVENTION

In consideration of the foregoing, an object of the present invention is to provide a color image processing apparatus capable of color image recording without color unevenness with a reduced memory capacity for image processing.

Another object of the present invention is to provide a color image processing apparatus capable of color image recording with screen dots with different screen angles respectively for different colors in which each square dot matrix is subjected to suitable deformation.

Still another object of the present invention is to provide an image processing apparatus capable of representing different density levels with different dot arrangements of the dots of a same number.

A still further object of the present invention is to provide an image forming apparatus which can derive from a density data signal of a plurality of bits output density data of a number of bits which is less than the plurality of bits in the density data signal by using a relatively simple configuration.

The foregoing and still other objects of the present invention will become fully apparent from the following description.

DETAILED DESCRIPTION OF THE PREFERRED EMBODIMENTS

The present invention will now be clarified in detail by the following description to be taken in conjunction with the attached drawings.

Figure 1:
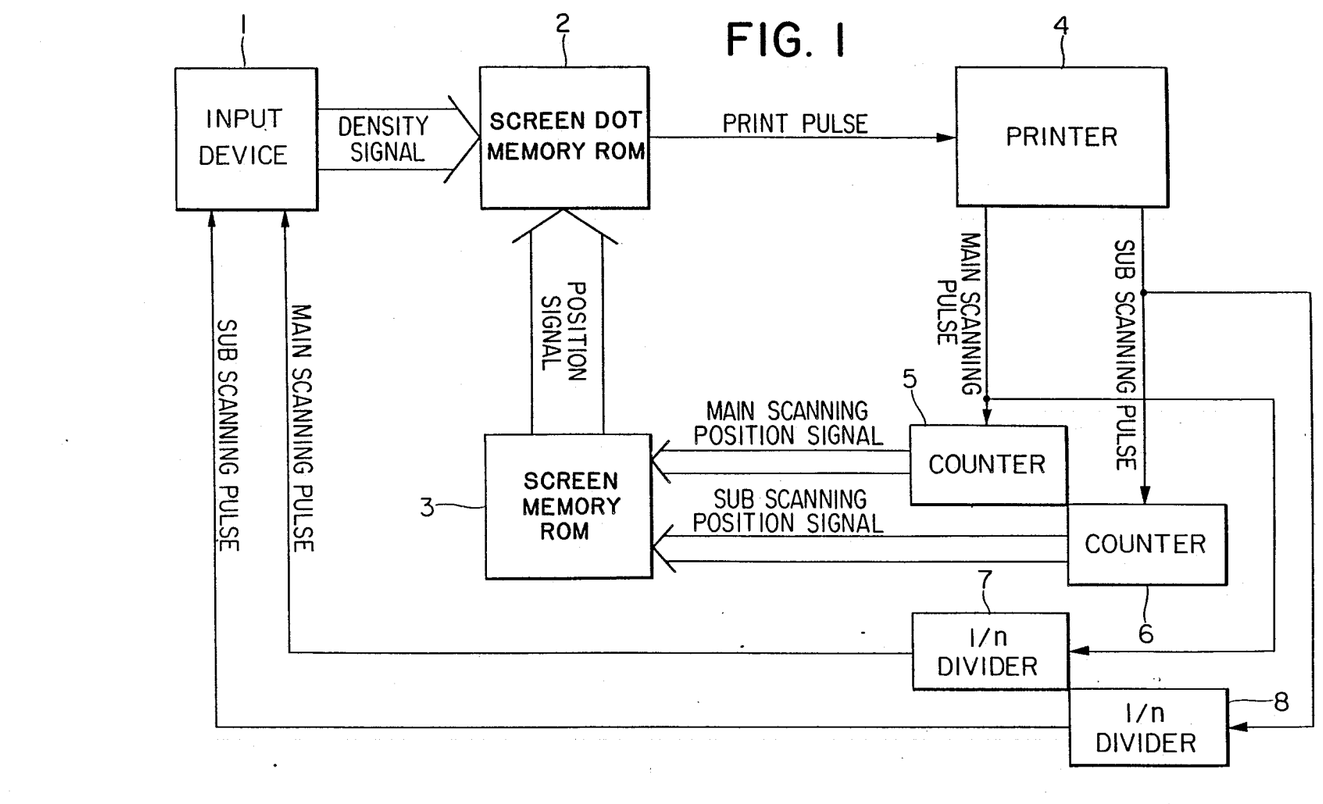
FIG. 1 is a block diagram schematically showing a color image processing apparatus embodying the present invention.

At first reference is made to FIG. 1 schematically showing the color image processing apparatus of the present invention, required for screen dot recording of a color. Therefore, in case of screen dot recording with plural colors, there will be required plural units of such apparatus corresponding to the number of colors to be used in such color image recording.

In the illustrated schematic structure, the color image signals to be recorded are temporarily stored in an input device 1, and density signals corresponding to successive pixels are supplied to a screen dot memory 2. In response to said density signal and to a position signal indicating a deformed dot matrix pattern of the screen dot pattern to be read from a screen memory 3, one of the dot matrix data stored in the screen dot memory 2 is read corresponding to the input pixel density signal and is supplied as print pulses to a printer 4, thereby effecting screen dot image recording with a color in the known manner. The printer 4 releases a main scanning pulse upon each movement of the recording head by a dot in the main scanning direction, and releases a subsidiary scanning pulse upon each movement of the recording position by a dot in the subsidiary scanning direction, respectively after recording of a dot in response to a print pulse mentioned above. Counters 5, 6 respectively count said main scanning pulses and subsidiary scanning pulses, and respectively supply the screen memory 3 with a main scanning position signal and a subsidiary scanning position signal, representing the successive recording position of pixels each composed of a determined dot matrix, whereupon a deformed dot matrix pattern signal corresponding to a succeeding recording position is supplied, as the position signal for such succeeding recording position, to the screen dot memory 2. Said main and subsidiary scanning pulses are respectively supplied to frequency dividers 7, 8 for division by a number n, which is the number of rows or columns of a square dot matrix resembling the deformed dot matrix pattern constituting each recorded pixel in the printer 4, i.e., the number close to the square root of the number of dots in each screen dot pattern, and the divided main and subsidiary scanning pulses thus obtained are supplied to the input device 1 for reading the density signal of a pixel corresponding to the succeeding pixel recording position.

Figure 2:
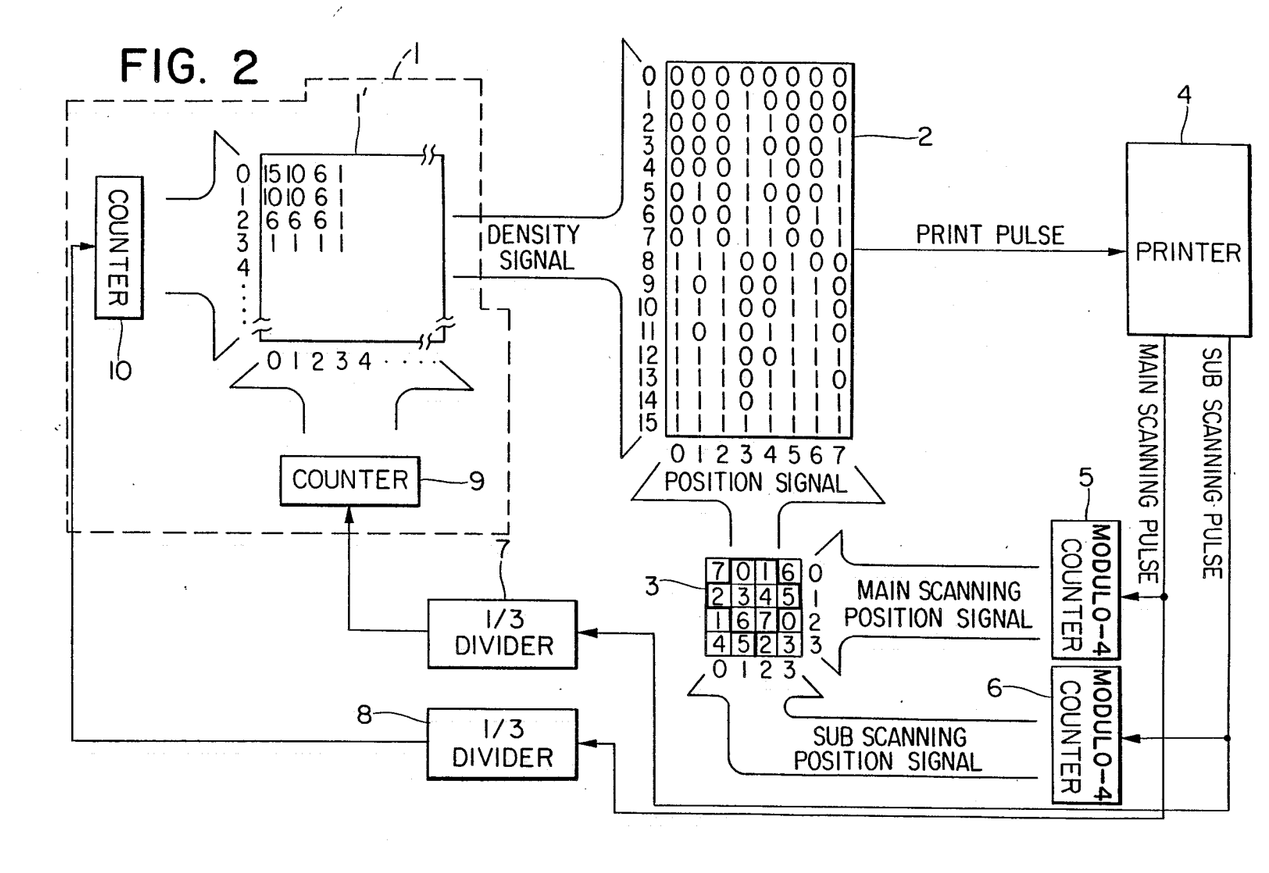
FIG. 2 is a block diagram showing more detailed structure of said apparatus.

Now reference is made to FIG. 2 showing in more detail the structure of the image processing apparatus schematically shown in FIG. 1. In the illustrated structure, the input device 1 is composed of a frame memory storing the pixel density signals of the color image to be recorded, and counters 9, 10 respectively for counting the divided main and subsidiary scanning signals thereby accessing the pixel image signal to be read next, and each pixel density signal is stored in said frame memory in the form of a 4-bit signal representing 16 density levels. The screen dot memory 2 is composed of a read-only memory or a random access memory storing arrangement of high-density dots "1" and low-density dots "0" in the screen dot matrix in each of 16 density levels "0" to "15", and the print pulses are released by accessing such dot arrangement data in response to the pixel density signal from the frame memory and the position signal from the screen memory 3. Said screen memory 3 constitutes, as will be explained later in relation to FIG. 3, a conversion reference table for reading the position of a deformed dot matrix composed of 8 dots arranged in a laterally widened cross shape, in each recording pixel of a 4×4 dot matrix of the printer 4, and provides a position signal indicating the position of said dot matrix in each recording matrix to the screen dot memory 2, in response to the main and subsidiary scanning position signals supplied from modulo-4 (divide-by-4) counters 5, 6 corresponding to the 4×4 dot matrix of the printer 4. The frequency dividers 7, 8 have a dividing ratio of 3, which is close to the square root of 8 corresponding to the number of dots in said deformed dot matrix.

Figures 3A, 3B:
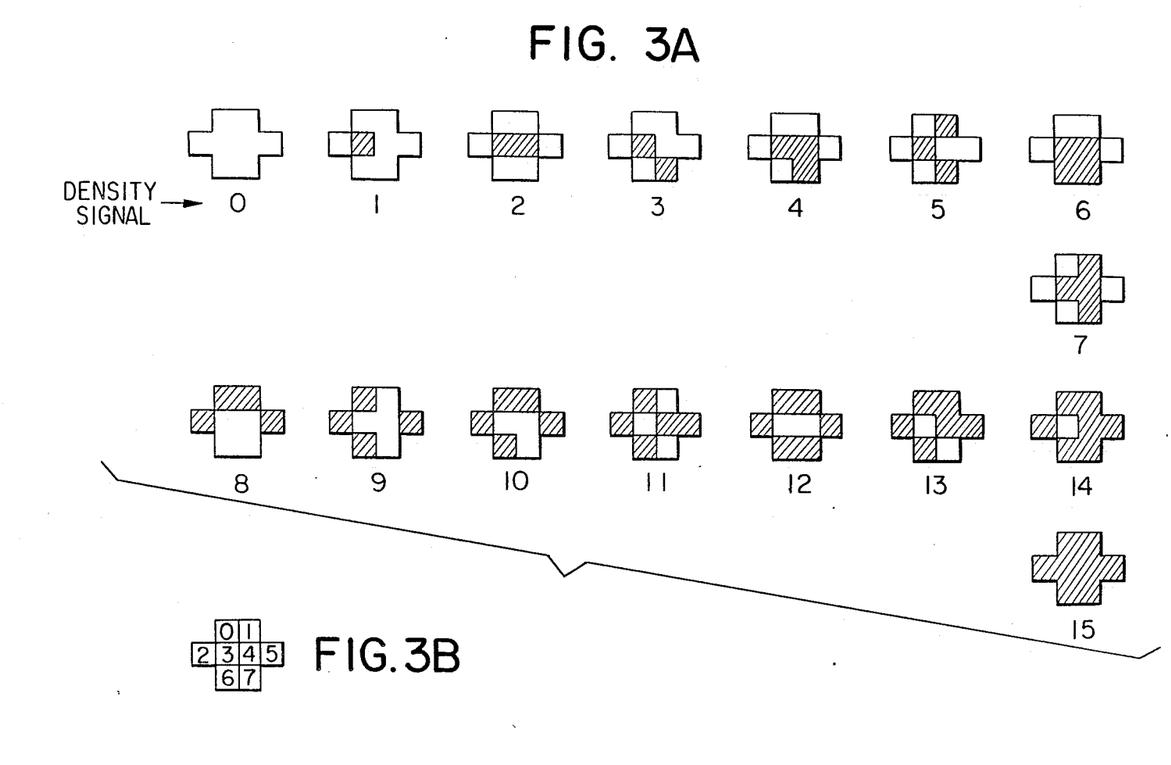
FIGS. 3A and 3B are views showing examples of screen dot patterns employed in the color image processing according to the present invention.

In case each dot matrix constituting the screen dot in the embodiment shown in FIG. 2 is composed of a deformed dot matrix of 8 dots "0" to "7" arranged in an approximately cross shape as shown in FIG. 3B, the 16 density levels of each pixel of the color image signals stored in the frame memory are represented as shown in FIG. 3A.

Figure 4:
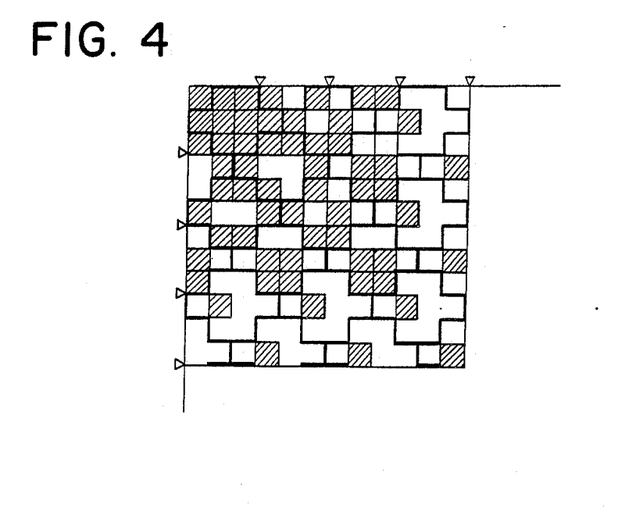
FIG. 4 is a view showing an example of image recording with said screen dot patterns.

FIG. 4 shows an example of image recording on the printer 4 with the screen dot patterns representing various density levels in response to the pixel density signals of the color image. As will be understood from FIG. 4, the deformed dot matrix patterns of the present invention can be mutually fitted without gaps or overlaps therebetween. Besides the screen angle is determined by the shape of the deformed dot matrix as will be explained later in relation to FIG. 5. Therefore the screen angle is determined automatically by the selection of the arrangement of the dot matrix patterns, and storage of different arrangement of dot matrix patterns for different screen angles is no longer necessary. FIGS. 5A-5H illustrate various deformed dot matrix patterns of the present invention corresponding to different screen angles. The screen angle in screen dot recording is defined, as illustrated, by the direction of mutually perpendicular lines obtained by connecting centers or particular points of screen dot patterns arranged in mutually fitting manner as explained before. On the other hand, in the conventional screen dot pattern composed of square dot matrixes as shown in FIG. 5A, the screen angle is always equal to 0° unless the arrangement of said screen dot patterns is inclined. In contrast, the deformed dot matrixes of the present invention as shown in FIGS. 5B to 5H can provide various screen angles as represented by lines connecting the centers or particular points of said matrixes.

In the ink jet printer or laser beam printer commonly used for color image recording, each dot has to be composed of a 3×3 or 4×4 dot matrix providing approximately 32 density levels at maximum, because of the limitation in the density of recording dots. FIGS. 5A to 5H show the obtainable screen angles in relation to the forms of deformed dot matrixes resembling such 3×3 or 4×4 dot matrixes. More specifically FIGS. 5A to 5D respectively illustrate a 9-dot pattern, an 8-dot pattern, a 10-dot pattern and a 13-dot pattern resembling the conventional 3×3 square dot matrix pattern, and FIGS. 5E to 5H respectively illustrate a 16-dot pattern, an 18-dot pattern, a 20-dot pattern and a 17-dot pattern close to the conventional 4×4 dot matrix, wherein the screen angles are, in the same order, 0°, 45°, 18.4°, 33.7° and 0°, 45°, 26.6°, 14.0°.

As explained in relation to FIGS. 5A to 5H, the deformation of the conventional dot matrix constituting each screen dot in such a manner that such deformed dot matrixes can be fitted to each other without gaps and overlapping therebetween while defining a desired screen angle enables screen dot recording of a color image of high quality through the use of a screen dot memory storing the arrangement of high-density dots in a pixel of each density level and of a screen memory storing the deformation patterns to be applied to the square dot matrix for obtaining desired screen angles, for each color to be recorded.

The following is an explanation concerning the capacity of read-only memory required in the color image processing apparatus of the present invention, in comparison with the foregoing conventional examples. In case of screen dot recording of 16 density levels with a 4×4 dot matrix, the deformed dot matrix composed of 8 dots requires a memory capacity of 4×4+16×8=144 bits for each color, which is approximately half of the 256 bits required in the conventional apparatus. Also in case of screen dot recording of 16 density levels with a 32×32 dot matrix, a deformed dot matrix composed of 17 dots requires a memory capacity of 32×32+16×17=1,296 bits for each color, which is about 1/15 of the memory capacity of 16,384 bits required in the conventional apparatus. In this manner the effect of memory capacity reduction becomes more marked in the screen dot color recording of finer quality.

In the foregoing embodiment the image is recorded on a printer, but the image may also be displayed for example on a cathode ray tube or may be stored for example in a disk.

As explained in the foregoing, the present invention allows, through the use of a screen dot pattern composed of a deformed dot matrix pattern in the processing and reproduction of a color image, to represent desired gradation with a significantly reduced memory capacity in comparison with the conventional technology, and also allows to define desired screen angles through the use of particular dot matrix forms, thereby enabling color image recording of high quality without color unevenness.

What I claim is:

1. Image reproducing apparatus comprising:
   image forming means for printing an image by scanning in main and sub-scanning directions;
   image data generating means for generating digital density data for an image frame to be printed by said image forming means responsive to first and second pulse signals representing an image forming position of said image forming means in the main and sub-scanning directions;
   position data generating means for generating position data, the position data being obtained in response to the first and second pulse signals; and
   a table memory, accessed in accordance with an address specified by the digital density data and the position data obtained in response to the first and second pulse signals
   for providing recording density data to be recorded by said image forming means at main and sub-scanning positions thereof corresponding to the position data, wherein the table memory includes a first table memory which is addressed in response to said first and second pulse signals for providing the position data and a second table memory which is addressed in response to the position data and the digital density data and provides the recording density data.

2. Image reproducing apparatus according to claim 1, wherein said position data generating means includes a first counter for counting pulses of the first pulse signal and a second counter for counting pulses of the second pulse signal, and wherein the position data is obtained in response to outputs of the first and second counters.

3. An apparatus according to claim 1, wherein the position data represents a position in a deformed matrix, a plurality of the deformed matrices being at least partially included in a rectangular matrix of n×m matrix elements, and wherein a plurality of the deformed matrices are arranged abutting each other at a predetermined angle by arranging a plurality of the n×m rectangular matrices in the main and sub-scanning directions in such a manner that none of said rectangular matrices is spaced apart from adjoining ones of the rectangular matrices or overlaps said adjoining rectangular matrices.

4. Image reproducing apparatus comprising:
   image forming means for forming an image by scanning in main and sub-scanning directions;
   a modulo-n first counter for counting a first pulse signal corresponding to the position of said image forming means in the main scanning direction;
   a modulo-m second counter for counting a second pulse signal corresponding to the position of said image forming means in the sub-scanning direction;
   density data output means for providing digital image density data corresponding to image pixels in the main and sub-scanning directions; and
   a table memory, accessed in accordance with an address specified by the digital image density data and position data determined by the counts of said first and second counters, for providing recording density data to be recorded by said image forming means at main and sub-scanning positions thereof corresponding to the position data, wherein the table memory includes a first table memory which is addressed by said first and second counters for providing the position data and a second table memory which is addressed by the position data and provides the recording density data.

5. Apparatus according to claim 4, wherein n is equal to m.

6. Apparatus according to claim 4, wherein said first and second table memories are read-only memories.

7. Image reproducing apparatus comprising:
   image forming means for forming an image by scanning in main and sub-scanning directions;
   a modulo-n first counter for counting a first pulse signal corresponding to the position of said image forming means in the main scanning direction;
   a modulo-n second counter for counting a second pulse signal corresponding to the position of said image forming means in the sub-scanning direction;
   density data output mean for providing digital image density data corresponding to image pixels in the main and sub-scanning directions; and
   a table memory, accessed in accordance with an address specified by the digital image density data and position data determined by the counts of said first and second counters, for providing recording density data to be recorded by said image forming means at main and sub-scanning positions thereof corresponding to the position data, wherein the table memory includes a first table memory which is addressed by said first and second counters for providing the position data and a second table memory which is addressed by the position data and provides the recording density data.

* * * * *

UNITED STATES PATENT AND TRADEMARK OFFICE
CERTIFICATE OF CORRECTION

PATENT NO. : 4,897,736
DATED : January 30, 1990
INVENTOR(S) : TAKASHI SUGINO

It is certified that error appears in the above-identified patent and that said Letters Patent is hereby corrected as shown below:

ON TITLE PAGE:

IN [57] ABSTRACT

Line 2, "date" should read --dots--.
    Line 3, "which" should read --while--.

COLUMN 5

Line 41, Close up right margin.
    Line 42, Indent left margin.

COLUMN 6

Line 34, "m," should read --m.--.
    Line 46, "density data output mean" should read --density data output means--.

Signed and Sealed this

Twenty-first Day of May, 1991

*Attest:*

HARRY F. MANBECK, JR.

*Attesting Officer*      *Commissioner of Patents and Trademarks*